United States Patent
Minegishi et al.

[11] Patent Number: 6,032,634
[45] Date of Patent: Mar. 7, 2000

[54] AIR INDUCTION SYSTEM FOR INTERNAL-COMBUSTION ENGINE

[75] Inventors: Teruhiko Minegishi, Katsuta; Minoru Oosuga; Junichi Yamaguchi, both of Hitachi; Yasushi Sasaki; Hiroyuki Nemoto, both of Katsuta; Yuzo Kadomukai, Tsuchiura; Ryuhei Kawabe, Hitachi, all of Japan

[73] Assignee: Hitachi, Ltd., Japan

[21] Appl. No.: 08/966,360

[22] Filed: Nov. 7, 1997

Related U.S. Application Data

[63] Continuation of application No. 08/729,617, Oct. 11, 1996, Pat. No. 5,704,326, which is a continuation of application No. 08/554,925, Nov. 9, 1995, which is a continuation of application No. 08/332,805, Nov. 2, 1994.

[51] Int. Cl.[7] ........................................ F02B 75/18
[52] U.S. Cl. ............................ 123/184.55; 123/184.61
[58] Field of Search ...................... 123/184.53, 184.55, 123/184.61

[56] References Cited

U.S. PATENT DOCUMENTS

| | | | |
|---|---|---|---|
| 3,111,937 | 11/1963 | Johnson et al. | 123/184.34 |
| 3,996,914 | 12/1976 | Crall et al. | 123/198 R |
| 4,006,724 | 2/1977 | Carter | 123/198 R |
| 4,738,229 | 4/1988 | Wada et al. | 123/184.55 |
| 4,793,294 | 12/1988 | Wada | 123/184.55 |
| 4,803,462 | 2/1989 | Asai | 123/184.48 |
| 4,803,961 | 2/1989 | Hiraoka et al. | 123/184.59 |
| 4,862,840 | 9/1989 | Matsunaga et al. | 123/184.55 |
| 4,960,096 | 10/1990 | Sukimoto et al. | 123/568 |
| 4,986,242 | 1/1991 | Bonfiglioli et al. | 123/478 |
| 5,255,638 | 10/1993 | Sasaki et al. | 123/184.57 |
| 5,813,380 | 9/1998 | Takahashi et al. | 123/184.55 |

FOREIGN PATENT DOCUMENTS

| | | | |
|---|---|---|---|
| 0122311 | 7/1983 | Japan | 123/647 |
| 2117043 | 10/1983 | United Kingdom | 123/184.36 |

*Primary Examiner*—Marguerite McMahon
*Attorney, Agent, or Firm*—Evenson, McKeown, Edwards & Lenahan, P.L.L.C.

[57] ABSTRACT

The present invention provides a compact air induction system for an internal-combustion engine in which an air inlet section, a collection section and the intake port section for a plurality of cylinders of the internal-combustion engine are formed adjacent to each other and connected directly or through a partition wall. A control unit for controlling the engine is mounted in the passage at the downstream of the air inlet section.

10 Claims, 16 Drawing Sheets

AIR INDUCTION SYSTEM FOR INTERNAL-COMBUSTION ENGINE

This is a continuation of application Ser. No. 08/729,617, filed Oct. 11, 1996, now U.S. Pat. No. 5,704,326, which is a continuation of application Ser. No. 08/554,925 filed Nov. 9, 1995, which is a continuation of application Ser. No. 08/332,805, filed Nov. 2, 1994.

BACKGROUND OF THE INVENTION

The present invention relates to an air induction system which supplies air and fuel to the combustion chambers of an internal-combustion engine.

In such air induction systems, the size, shape and configuration of the air intake passage determines not only the efficiency with which intake air flows to the combustion chambers of the engine, but also the resonance frequency of the system. The latter parameter is important in particular when the engine is designed for resonance supercharging, in which case it is advantageous to provide an arrangement for modifying the resonance frequency of the system to adapt it to the operating speed of the engine. It is also important to make such air induction systems as simple and compact as possible, so as to reduce the space required for mounting, permitting greater latitude in the design of the automobile engine compartment In a prior-art as disclosed in Japanese Patent-Laid Open No. Hei 4-175,465, the air induction system is compactly formed as a unit, with a collector section and a separate intake section. However, an injection valve, a throttle, an intake air flow sensor and an air inlet section are separately assembled. This arrangement is inferior with regard to assembly and mounting efficiency because the injection valve, the throttle, the intake air flow detector, and the air inlet section are assembled separately.

It is an object of the present invention to provide an air induction system for an internal-combustion engine in which an air inlet section, a collector section,and the engine intake ports, etc. are installed in compact form, for the purpose of decreasing the height of the engine to enable slanting a hood of a motor vehicle, thereby improving aerodynamic characteristics and fuel economy of the motor vehicle.

SUMMARY OF THE INVENTION

In the air induction system according to the invention air that has entered at an air inlet flows through an intake air flow sensor and a throttle, into a separate passage section. From there, it flows through a collector section, into an intake port section which has separate intake ports corresponding to each cylinder, and thence into the engine combustion chambers.

In order to achieve a compact design, the passage section, the collector section and the intake port section are arranged adjacent to each other and connected directly or through a partition wall. Also a control unit for controlling the engine is mounted in the passage downstream of the air inlet section.

According to the present invention, the whole air induction system composed of the air inlet section, the intake ports, etc. is built compactly to thereby enable effective utilization of the interior of the engine compartment.

Because passages are formed by utilizing the partition walls for adjacently assembling the above-described parts, it is possible to make the air induction system compact, without requiring excess space.

Other objects, advantages and novel features of the present invention will become apparent from the following detailed description of the invention when considered in conjunction with the accompanying drawings.

DETAILED DESCRIPTION OF THE INVENTION

The air induction system of the invention is arranged with an air inlet section 7, 8, a collection section 9 and an intake port section 10 adjacent to each other and separated by partition walls 13.

Figure 1:
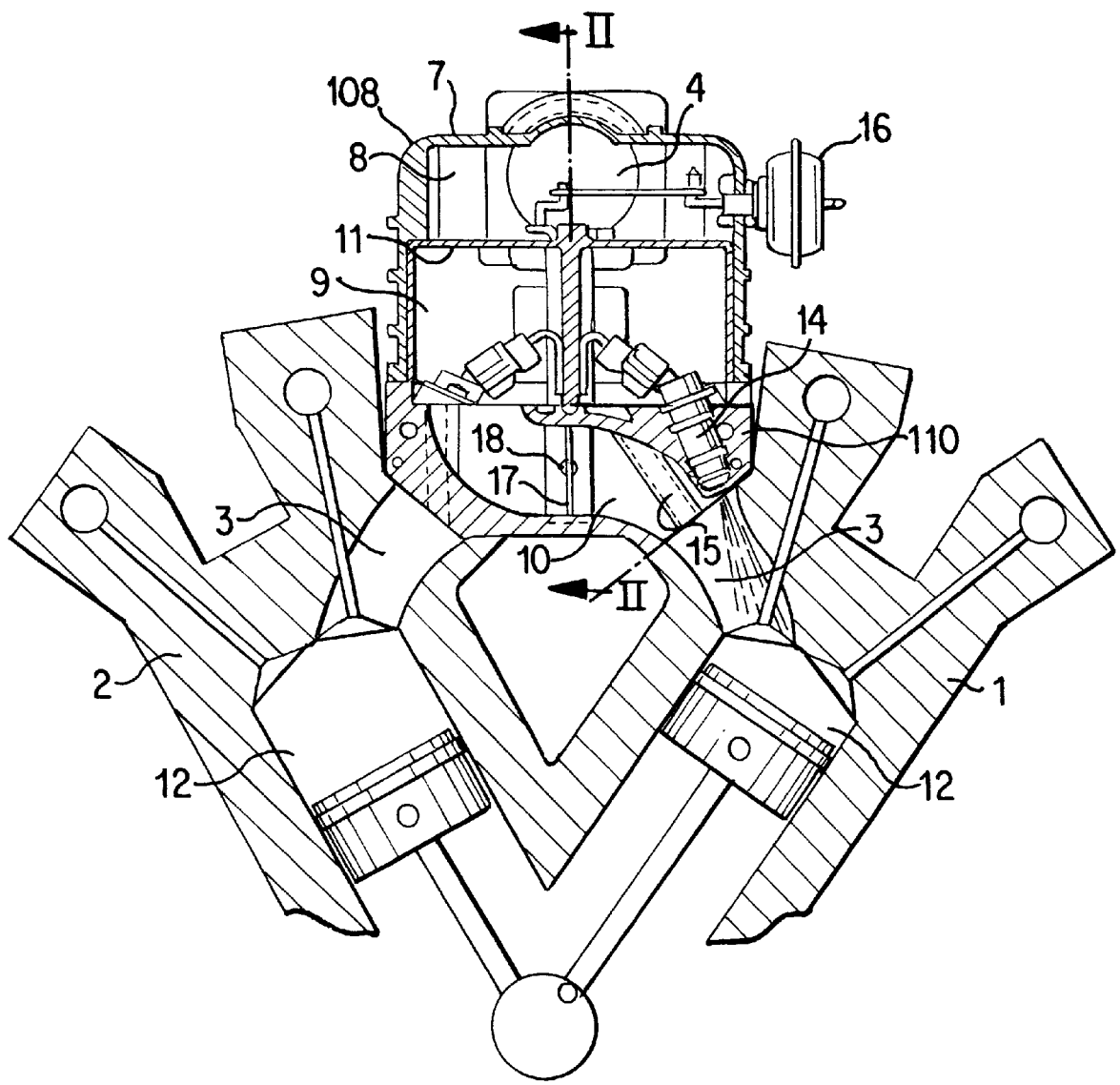
FIG. 1 is a transverse sectional view of an air induction system according to the invention, installed in a V-type engine.

FIG. 1 shows a first embodiment of an air induction assembly according to the present invention mounted in a V-type engine, with two cylinder banks 1, 2 set at an angle to each other, right and left. This V-type engine generally has 6, 8 or 12 cylinders, to any of which the present invention is applicable. In the V-type engine, a space is formed between the right and left banks 1 and 2 in which the air induction system (or a part of it) is mounted. The air induction system, therefore, must be made compact.

Figure 2:
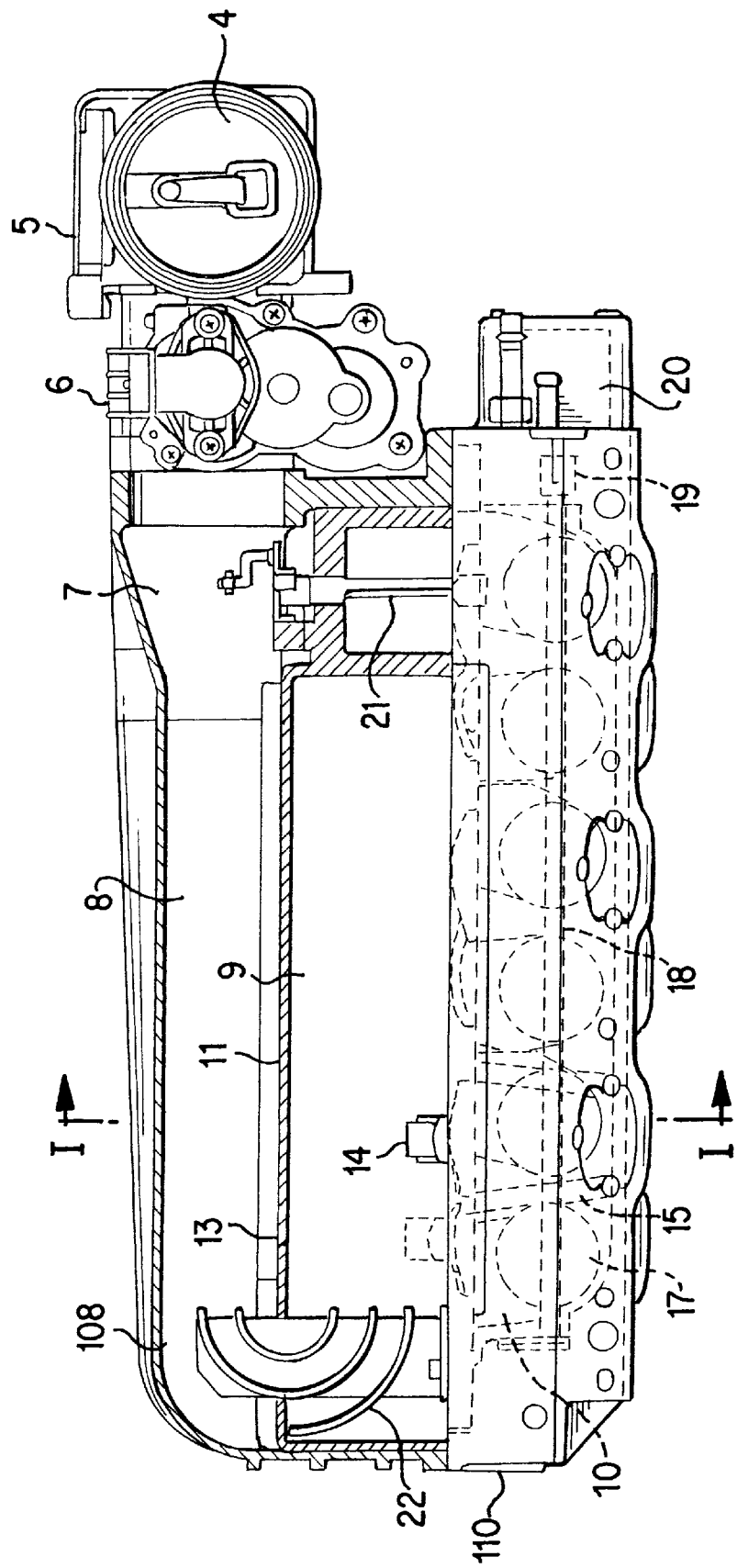
FIG. 2 is a longitudinal sectional view of the air induction system of FIG. 1, viewed along line II—II.

FIG. 1 is a transverse sectional view from the end of the engine showing the banks 1 and 2. FIG. 2 is a longitudinal partial sectional view of the air induction assembly in FIG. 1. As can best be seen in FIG. 1, the air induction system according to the invention includes three principal sections or chambers, which are arranged adjacent to each other separated by a common wall. These include an air inlet section 7, 8, a collector section 9 and an intake port section 10. The air that has entered an air cleaner (not shown) passes through an intake passage 4 to an air flow sensor 5, (such as a hot-wire type, moving vane type, or sensing pressure type), and then through a throttle 6 for controlling the quantity of intake air being supplied into the engine. The throttle 6 may be driven either mechanically or electrically by a motor.

The air that has passed through the throttle 6 flows through a connector section 7 which provides a transition from the generally circular cross section of the throttle 6 to a passage section 8 (which has a generally rectangular cross section), into a collector section 9 and then to intake port section 10 where it is distributed to intake ports for each cylinder of the engine. A collector body 108 includes the air inlet section 7, and the collector section 9, and an intake port body 110 includes the intake port section 10. Thereafter the air flows through intake ports 3 into combustion chambers 12 of the engine.

In the above-described arrangement, the passage section 8, the collector section 9 and the intake port section 10 are situated adjacent to each other, separated by common partition walls, and are connected directly or through the partition walls in order to provide a compact intake system. The order of these three components is not specified. As described hereinafter, an electronic control unit for controlling the engine may be mounted on the partition wall 11 located between the passage section 8 and the collector section 9 with space and cooling effects taken into consideration. The control unit 13, therefore is cooled by intake air.

An injection valve 14 is arranged in the intake port 3 of each cylinder, as well as an air passage 15 for causing a swirl of air within the combustion chamber 12. (This air passage 15 is unnecessary, when the formation of a swirl is not required.) In the body of the intake port section 10 there are provided flow dividing valves 17 for controlling the air flow into the intake port section 10 and the air passage 15 of each cylinder to produce the swirling motion. The flow dividing valve 17 is supported on a shaft 18 and coupled to a driving device 20 by a coupler 19 installed on one end of the shaft 18. (In the present embodiment, a butterfly valve is shown as an example of the flow dividing valve 17, but the same effect can be achieved by the use of a slide valve or other type of valve. Furthermore, the driving device 20 may be an electric motor or a diaphragm making use of a pressure difference.) As described in greater detail hereinafter, in the collector section 9, a control valve 21 controls an air column resonance point in order to improve engine intake efficiency. (In the present embodiment, a butterfly valve is shown as an example of the control valve 21 controlling the air column resonance point, and an actuator 16 drives the control valve 21, but the same effect is feasible by the use of a slide valve and so forth.)

Figure 3:
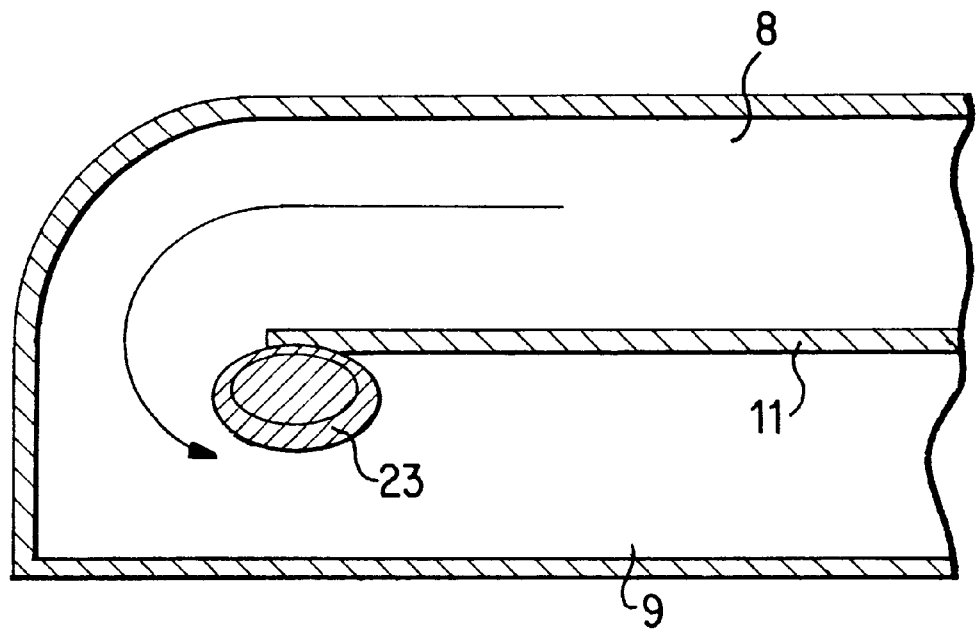
FIGS. 3 and 4 are sectional views showing the air flow in a portion of the air induction system.
Figure 4:
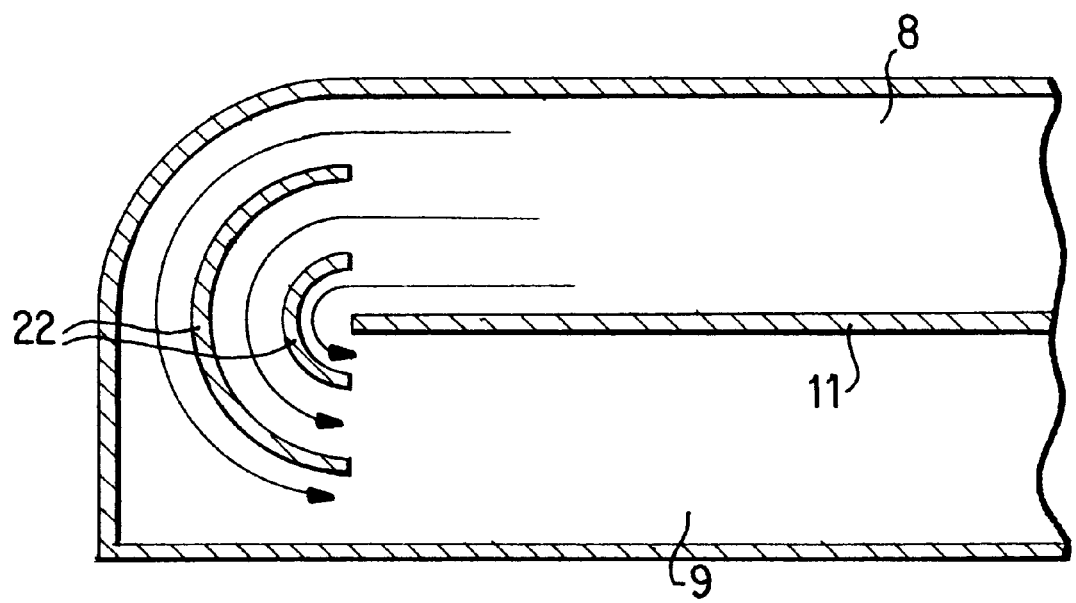

In the embodiment of FIG. 1, rectifiers 22, which may be made of either metal or a resin, are provided between the passage section 8 and the collector section 9 where the intake passage turns, for the purpose of directing the intake air flow. (FIGS. 3 and 4) In the bent section of the intake air flow there occurs an exfoliated air flow portion 23 as shown in FIG. 3. The rectifiers 22 provided in the passage as shown in FIG. 4, conduct the air flow around the turn, thus decreasing the amount of turbulence or the exfoliation, reducing intake air resistance likely to be caused by the exfoliation, and accordingly preventing a reduction in power of the engine. The presence of the rectifiers 22, however, is not essential for proper operation of the invention.

Figure 5:
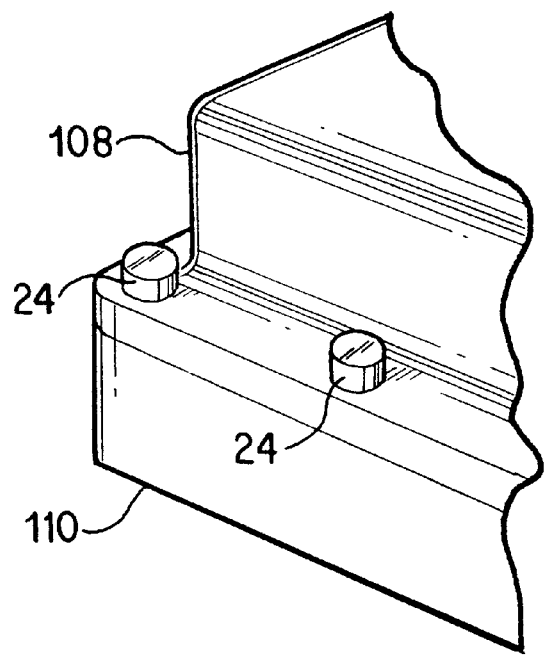
FIG. 5 and 6 are explanatory views of an intake port assembly.
Figure 6:
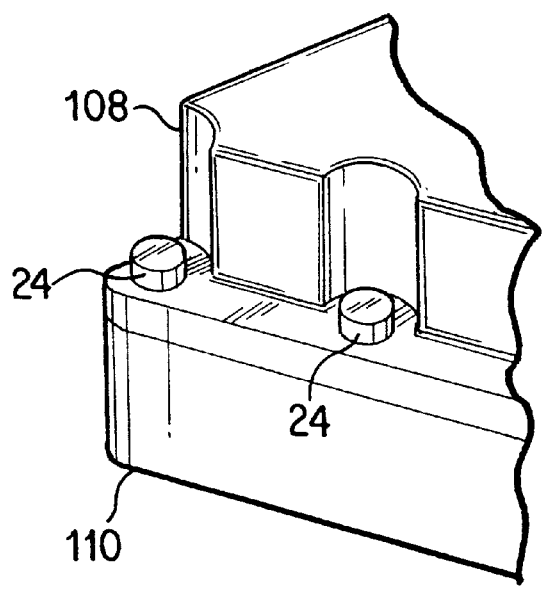

The collector body 108 and the intake port body 110, referred to above, are fastened by fastening means 24, as shown in FIGS. 5 and 6. The collector body 108 constructed as shown in FIG. 5 is formed with flat surfaces and therefore is disadvantageous in the respect of strength in relation to an external force. On the other hand, the collector body 108 of the present invention constructed as shown in FIG. 6 has a three-dimensional construction which is significantly stronger.

Figure 7:
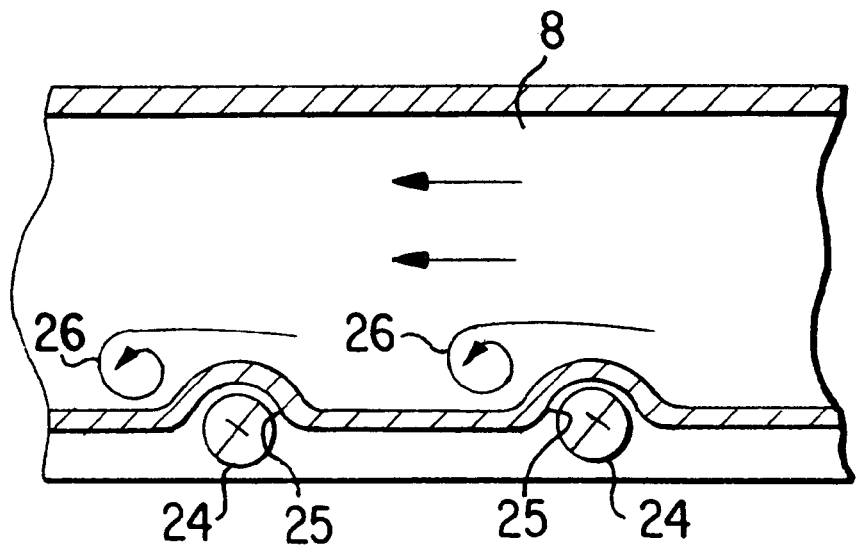
FIGS. 7 and 8 are explanatory views of an air stream in the intake port.
Figure 8:
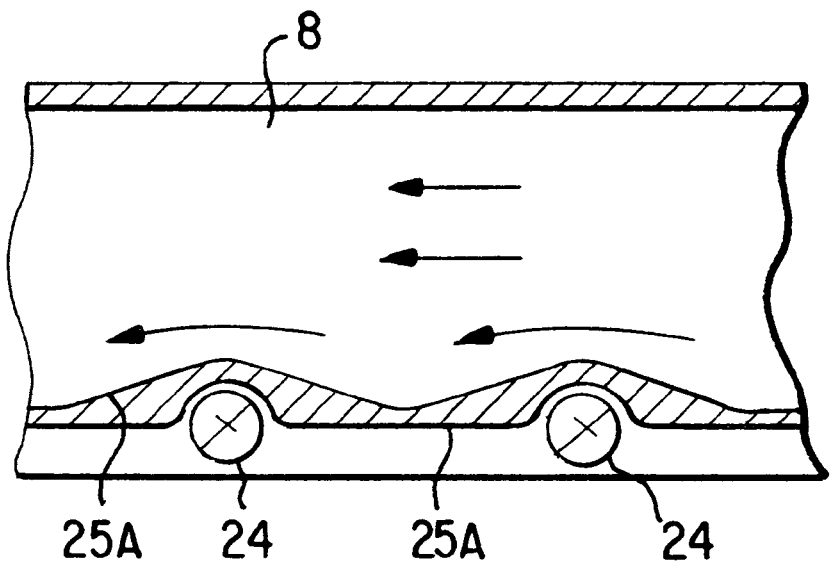

Next a further feature of the invention will be explained by referring to FIGS. 7 and 8, in which an arrow indicates the stream of air flowing in the passage section 8 or the collector section 9. A projection explained in FIG. 6 is present in the passage section 8 or collector section 9 which may cause turbulence 26 of the air stream in the vicinity of the projecting portion 25 as shown in FIG. 7. In FIG. 8, which shows the present invention, however, a projection portion 25A gradually changes shape, and there occurs no turbulence. This prevents the intake air resistance from increasing in this area.

Figure 9:
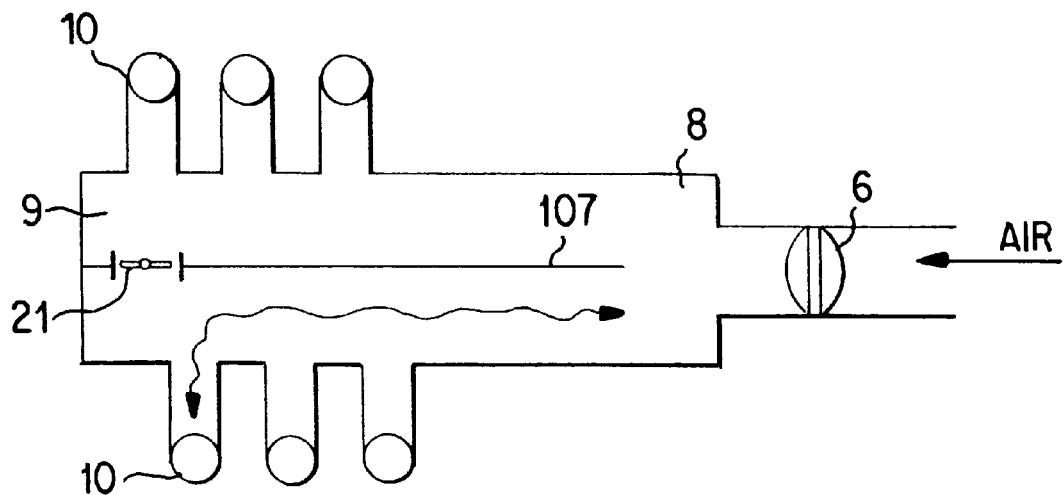
FIGS. 9 and 10 illustrate the principle of resonance in the intake port.
Figure 10:
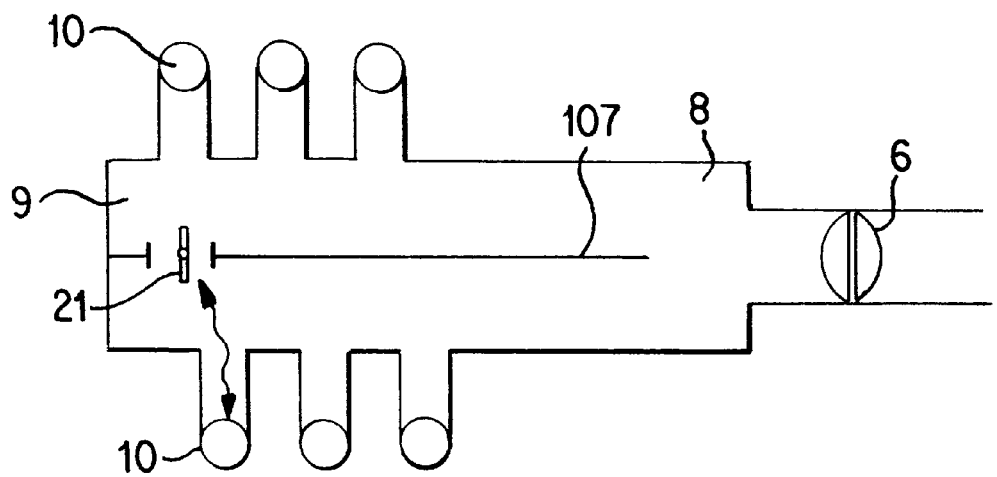

The principle of resonance of the air column in the air induction system according to the invention is illustrated in FIGS. 9 and 10, in which an air intake system is shown as divided between portions for each cylinder bank of a V-type engine by means of a partition wall 107, which includes a control valve 21 for controlling the resonance point of the air column. As shown in FIG. 9, with the control valve 21 closed, the throttle 6, the passage section 8, the collector section 9 and the intake port section 10 form one passage and therefore the intake passage related to supercharging becomes quite long, thus resulting in a decreased resonance frequency and gaining a resonance effect at a low engine speed. On the other hand, as shown in FIG. 10, when the control valve 21 is open, the intake system extends to the open section of the control valve 21. Therefore, because the resonance section is short, resonance supercharging is done at a high speed. The length of the resonance intake port can be changed as described above by operating control valve 21, thereby enabling the supercharging in a wide range of engine speeds. The provision of the control valve 21 as part of the partition wall 107 has become feasible because it is unnecessary to provide a special intake passage, and it has thus become possible to constitute the air induction system compactly.

Figure 11:
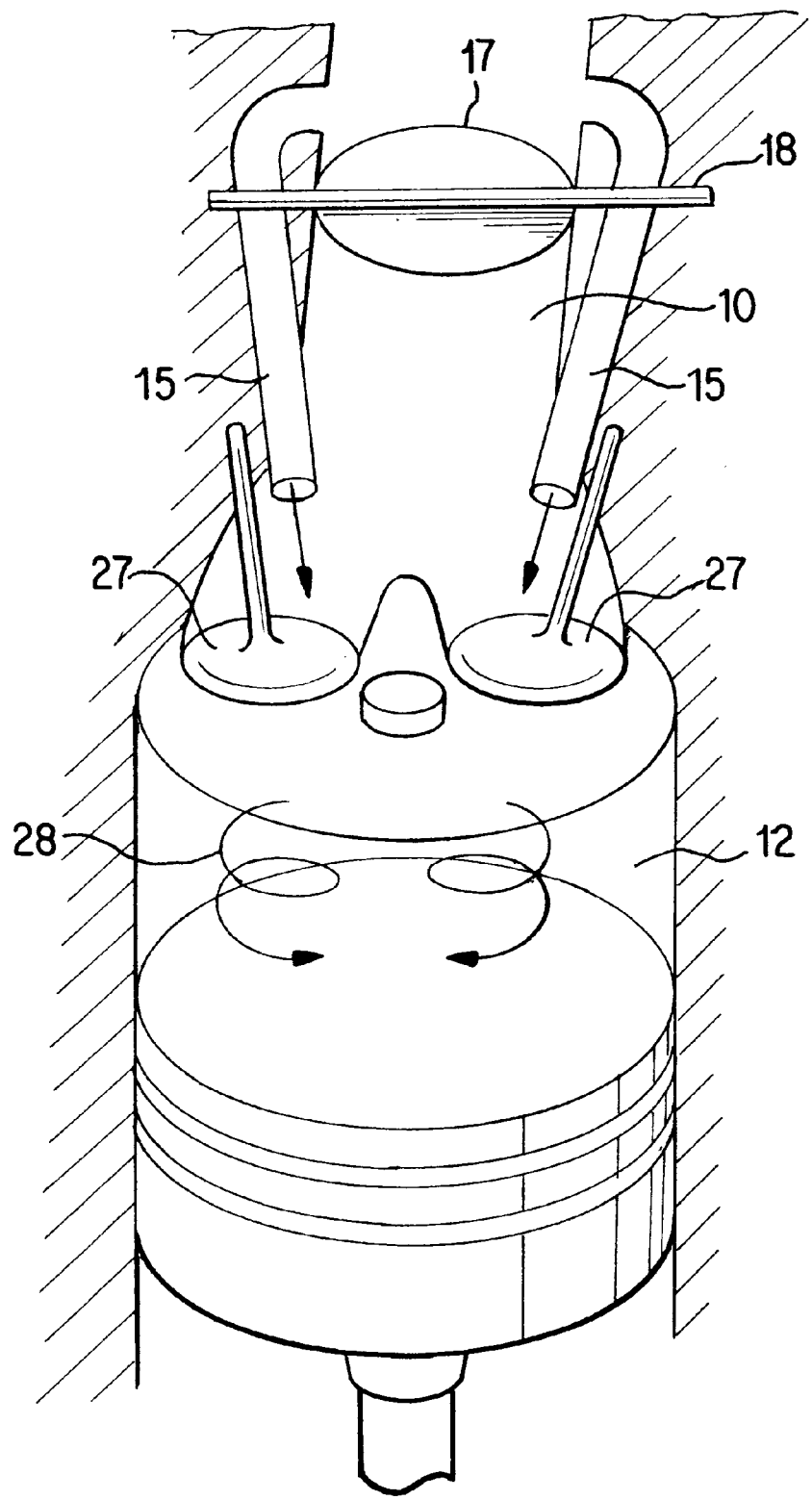
FIG. 11 shows the arrangement of a swirl passage.
Figure 12:
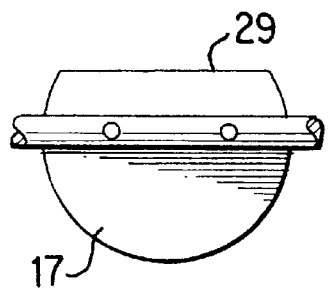
FIG. 12 shows the swirl valve.

Next, a mechanism for creating the swirl within the combustion chamber 12 of the engine will be explained by referring to FIG. 11. The intake air drawn into the combustion chamber 12 passes through the flow dividing valve 17 (see also, FIG. 2), the intake port section 10, and intake valves 27, being drawing into the combustion chamber 12. At this time, the ratio of the intake air which flows through the intake port section 10 and the air passage 15 can be changed by opening and closing the flow dividing valve 17. When the flow dividing valve 17 is closed, a large part of the intake air passes through the air passage 15. However, the intake air stream, having a directional property as indicated by an arrow in the drawing, produces a swirl 28 in the combustion chamber 12. In such a system for imparting the swirl motion in the combustion chamber 12 by using the deflected stream of intake air in the intake port section 10, the flow dividing valve 17 partly having a cutout 29 as shown in FIG. 12 may be used. Furthermore, in the air induction system having two air passages 15 in the intake port section of the engine corresponding to two intake valves 27, a similar effect can be obtained by the use of the flow dividing valve 17 designed to close the air passage 15. In the V-type engine, the intake port section 10 is situated in an area between the two cylinder banks and the flow dividing valve 17 is also a located there. Furthermore, the plurality of the flow dividing valves 17, as shown in FIG. 13, for all cylinders are supported by the shaft 18 (see FIG. 2).

Also as described above, the valve may be the flow dividing valve 17 having the cutout 29 in a part thereof. It should be noted, however, that in the case of the system having two air passages 15 in the intake port section corresponding to two intake valves 27, a similar effect may be achieved by the use of two swirl control valves, one in each air passage 15, instead of the flow dividing valve 17.

Figure 13:
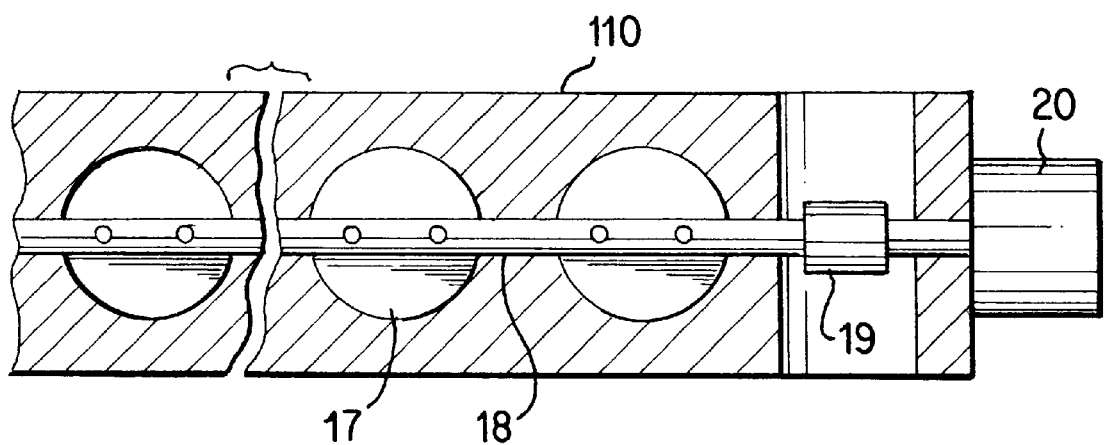
FIG. 13 shows the flow dividing valve section.
Figure 14:
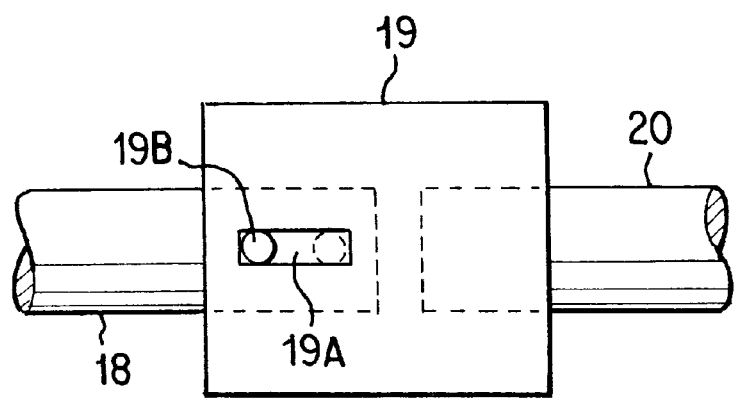
FIG. 14 shows the construction of the flow dividing valve shaft coupler section.

In the intake system in which the flow dividing valve 17 of all the cylinders are supported on shaft 18 alone, since the intake port body 110 and the shaft 18, which are likely to have different thermal expansion coefficients, are formed in a unitary construction as shown in FIG. 13, it is possible that the flow dividing valve 17 will fail to operate smoothly due to temperature changes, if the axial movement of the shaft 18 is restricted. As shown in FIG. 14, in order to alleviate this problem, the coupler 19 which connects the shaft 18 with the driving device 20 is provided with a slit 19A in which a fixing pin 19B fixed on the shaft 18 is fitted to allow the axial movement of the shaft 18 to transmit only a rotary motion from the driving device 20, thereby enabling the absorption, by the axial movement of the shaft 18, of a difference in the axial thermal expansion or contraction of the intake port body 110 and the shaft 18 caused by temperature changes. The flow dividing valve 17, therefore, can always operate smoothly. It should be noted that the arrangement of the coupler 19 shown in FIG. 14 can be realized also by such a constitution that a slit is provided in the shaft 18 and the fixing pin 19B is fixed in the coupler 19.

Figure 15:
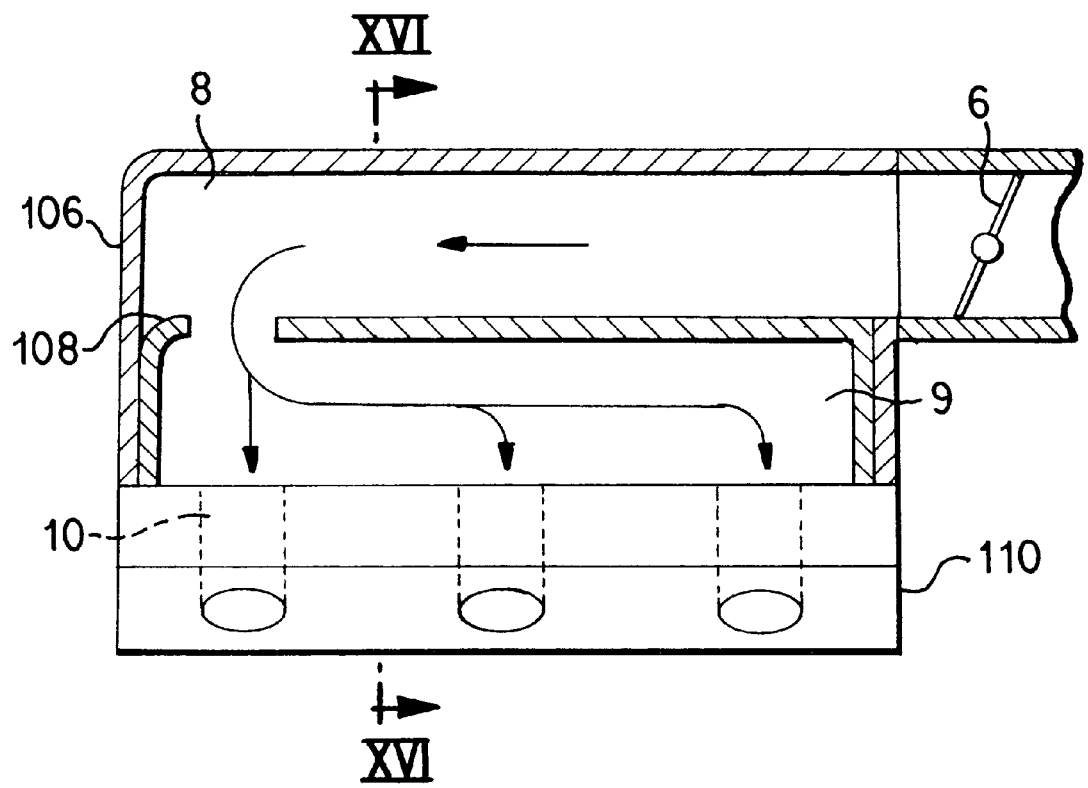
FIG. 15 is a longitudinal sectional view showing the arrangement of an intake port body.
Figure 16:
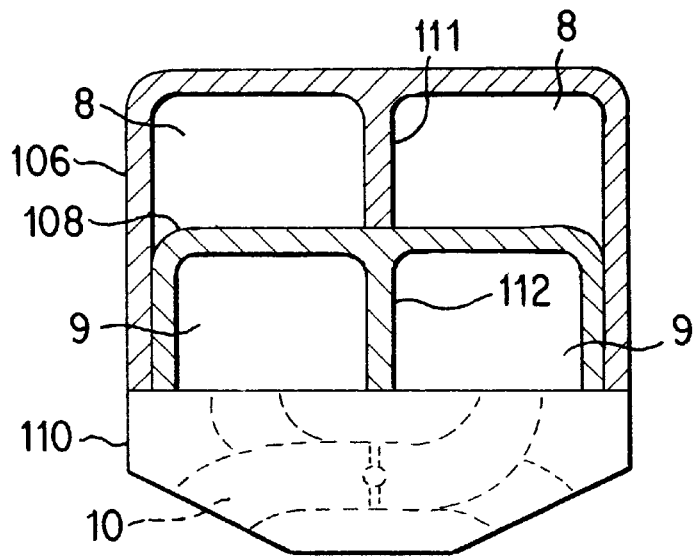
FIG. 16 shows a transverse section of the intake port body of FIG. 15, taken along the lines XVI—XVI.

FIGS. 15 and 16 show additional construction details of an embodiment of the air induction system according to the invention. FIG. 15 is a longitudinal sectional view which shows intake air drawn in as indicated by the arrow. FIG. 16 is a transverse sectional view showing the present embodiment taken along line a—a of FIG. 15. The passage section 8 and the collector section 9 are divided longitudinally by partition walls 111 and 112 (FIG. 16) respectively to separate the passage section 8 and the collection section 9 for each bank of the engine, for the purpose of resonance supercharging as previously described. In the present embodiment, the collector body 108, and the passage section body 106 both have an E-shaped sectional form and are formed by superpositioning. This type of construction provides additional strength with respect to an external force because of the partition walls 111 and 112 of ribbed construction, and because of the effect of superpositioning. This arrangement is also advantageous in manufacturing and cost because of its relatively simple configuration. If no resonance supercharging is adopted, the passage section body 106 and the collector body 108 need not be of an E-shaped sectional form, and may be of a channel-type section or a box-type section.

Figure 17:
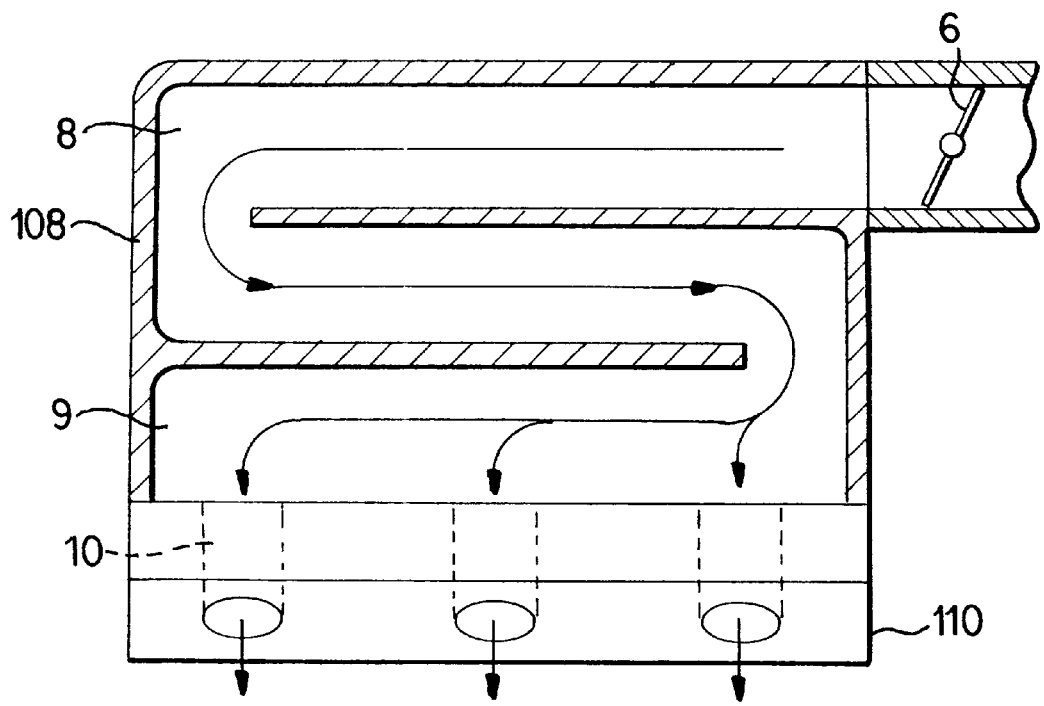
FIG. 17 is a longitudinal sectional view showing another embodiment of the intake port body according to the invention.

FIG. 17 shows another embodiment of the invention, in which the collector body 108 is superposed in three stages. In this arrangement, the intake air stream from the throttle 6 to the intake port section 10 is as indicated by the arrow in the drawing. For a given fixed length of the intake passage, the longitudinal mounting space of the air induction system viewed in the longitudinal direction of the engine can be decreased. In this drawing, the air induction system has the three stages of collector body superposed, but the number of stages is not limited.

Figure 18:
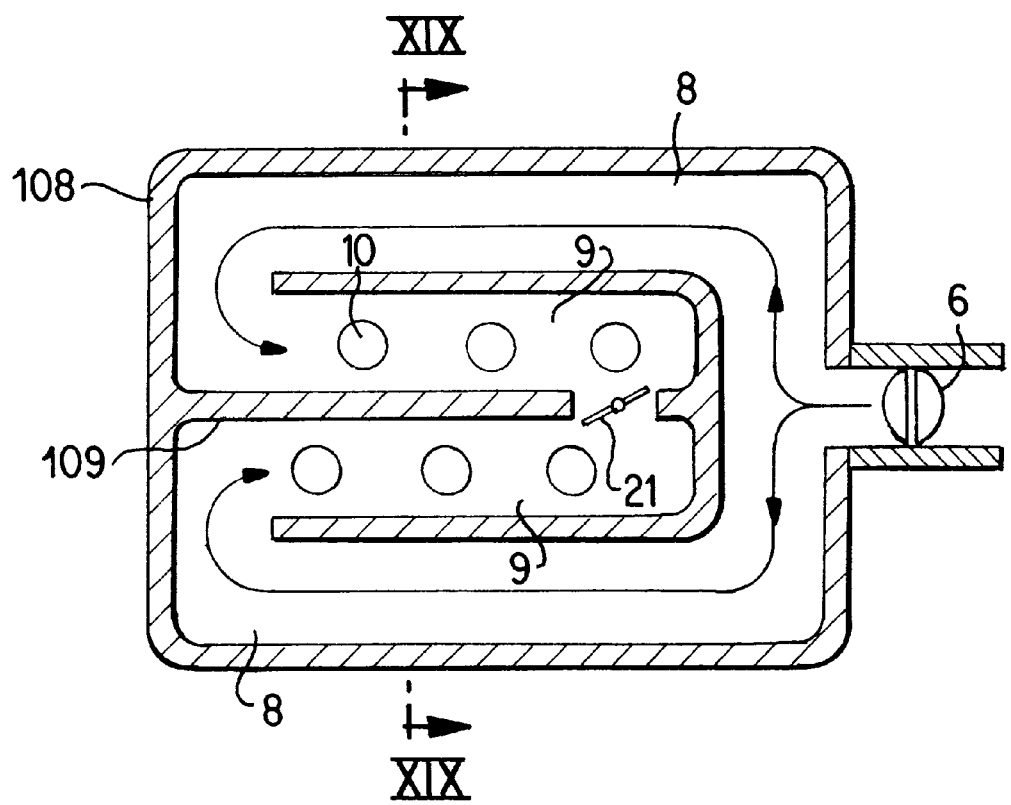
FIG. 18 is a horizontal longitudinal sectional view of still another embodiment of the intake port body.
Figure 19:
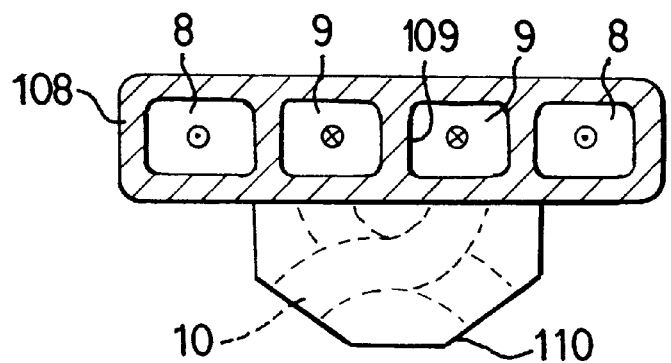
FIG. 19 is a transverse sectional view of the embodiment of FIG. 18.

Still a further embodiment of the invention shown in FIGS. 18 and 19 provides an alternative arrangement of the passage section 8 and the collector section 9. The intake air that has passed through the throttle 6 flows through the passage section 8 and collection section 9, which lie adjacent each other in a horizontal arrangement, and then into the intake port section 10. A partition wall 109 is provided with the control valve 21 controlling the air column resonance point. In this embodiment, because the passage section 8 and the collector section 9 are arranged in the horizontal direction with respect to the engine, it is possible to decrease the required space in the height direction of the engine. It is to be noted that where no resonance supercharging is adopted, there is no necessity to separate the collector as in the present embodiment and the collector may be of one box-type constitution. FIG. 19 shows the section b—b of FIG. 18; the passage section 8 and the collection section 9 arranged horizontally are separated by the partition wall 109 by each cylinder bank relative to the engine. Here, the number of rows of the passage section 8 and the collection section 9 is not limited.

Figure 20:
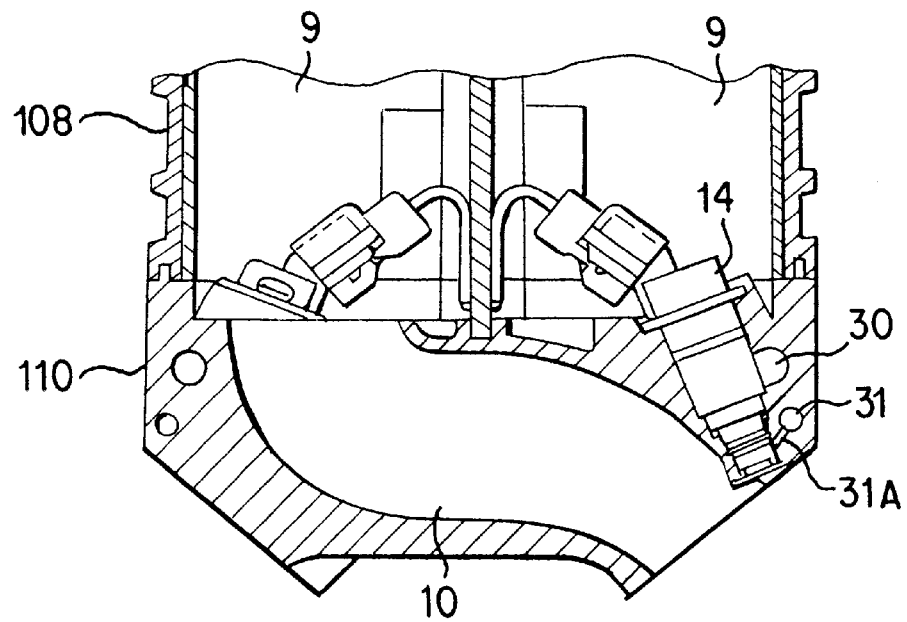
FIGS. 20 and 21 show the arrangement of a fuel line, and a coolant line, respectively.

FIG. 20 shows a transverse sectional view of the injection valve 14 section, which is installed within the intake port body 110. The injection valve 14 receives the fuel being supplied through a fuel line 30 arranged in the intake port body 110. Within the intake port body 110 is provided an intake air line 31 for improving fuel atomization at the time of fuel supply from the injection valve 14 to the engine. The air supply form the intake air line 31 to the injection valve 14 is effected through a small hole 31A. The present embodiment, as described above, requires no separate feed lines like those in conventional intake systems, for supplying the fuel and air to the injection valve 14, and therefore is effective to decrease mounting space and cost. The present embodiment is feasible as a matter of course even in the constitution without the intake air line 31, that is, in the system which will not improve fuel atomization by the air.

Figure 21:
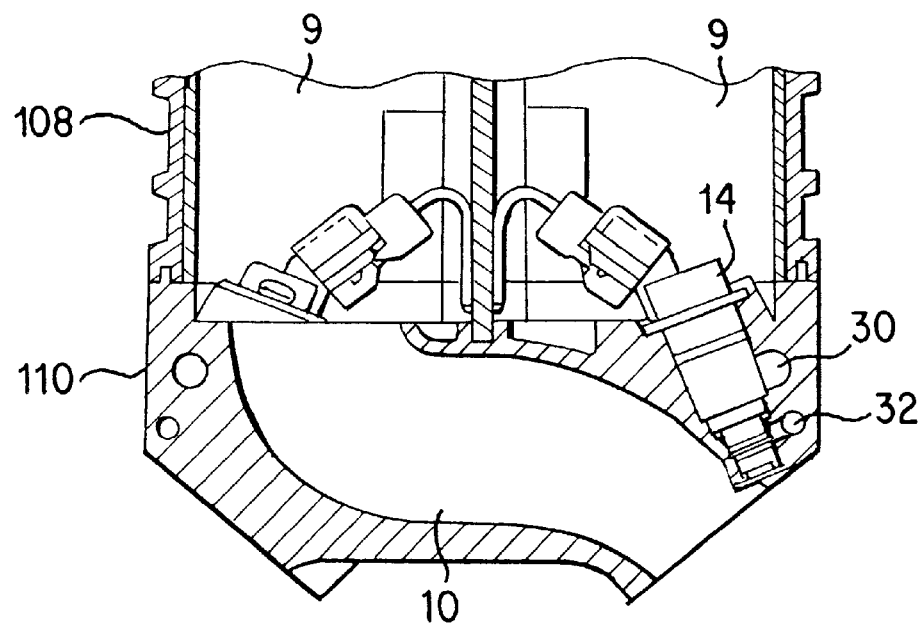

FIG. 21 is a sectional view showing the injection valve 14 like FIG. 20. The injection valve 14 is supplied with the fuel from the fuel line 30 installed within the intake port body 110. In the vicinity of the fuel line 30 in the intake line body is provided a cooling fluid passage 32. The cooling fluid flowing in the cooling fluid passage 32 flows through in the engine. Flowing the cooling fluid through the cooling fluid passage 32 cools the fuel line 30, and therefore, it is possible to protect the fuel line 30 from heat from the engine, and accordingly to prevent vapor lock in the fuel system.

Figure 22:
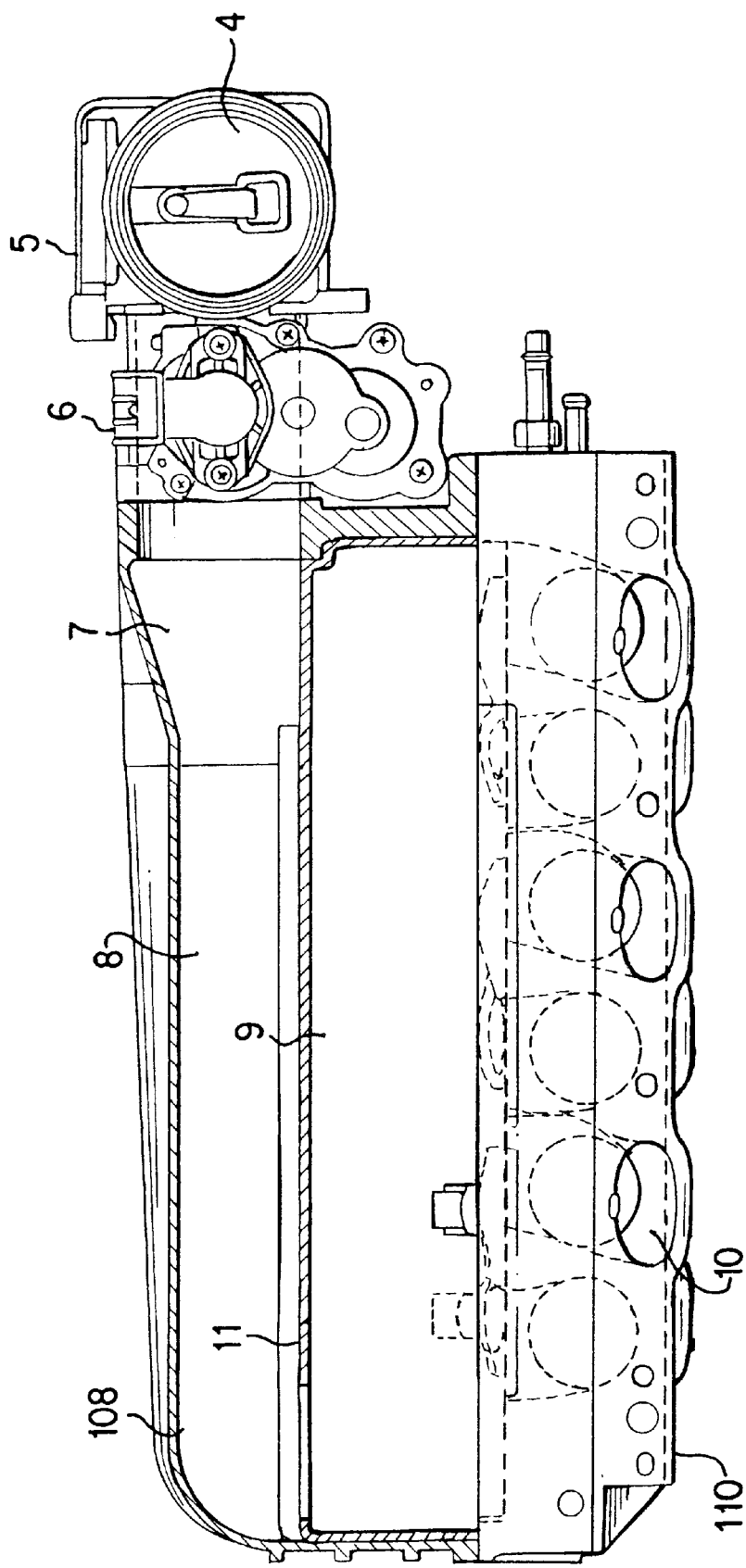
FIG. 22 shows another embodiment of the intake port body according to the invention.

FIG. 22 is a sectional side view of a variation of the embodiment of FIG. 2. (Members performing the same function are designated by the same reference numerals as those used in FIG. 2.) In this arrangement, the air from the air cleaner (not shown) flows through the passage 4, past the intake air flow sensor 5, and through the throttle 6, which controls the intake air flow to the engine. The air that has passed the throttle 6 flows through the passage section 8 and the collector section 9, into the intake port section 10 corresponding to each cylinder. Thereafter, the air flows through the intake ports 3 of the engine into the combustion chamber 12 (FIG. 1). In this embodiment, the intake port body 110 is formed of metal, and the collector body 108 is formed of resin. The intake port body 110 formed of metal is effective to restrain vibration of each bank inherent to the V-type engine, whereas the collector body 108 formed of resin, which has a high freedom of molding, and can realize an intake port of nearly ideal configuration. Moreover, because the wall thickness of, collector body 108 can be decreased, it is possible to reduce the required mounting space and weight. Furthermore, a resin molding, generally has a smoother surface than a metal molding, and will not increase the intake air pressure in the intake port section 110 when used in the intake port, and accordingly, has an effect to improve the intake efficiency. It should be noted that, in the present embodiment also, a part or all of the components explained in the embodiment referred to in FIG. 2 are applicable.

Figure 23:
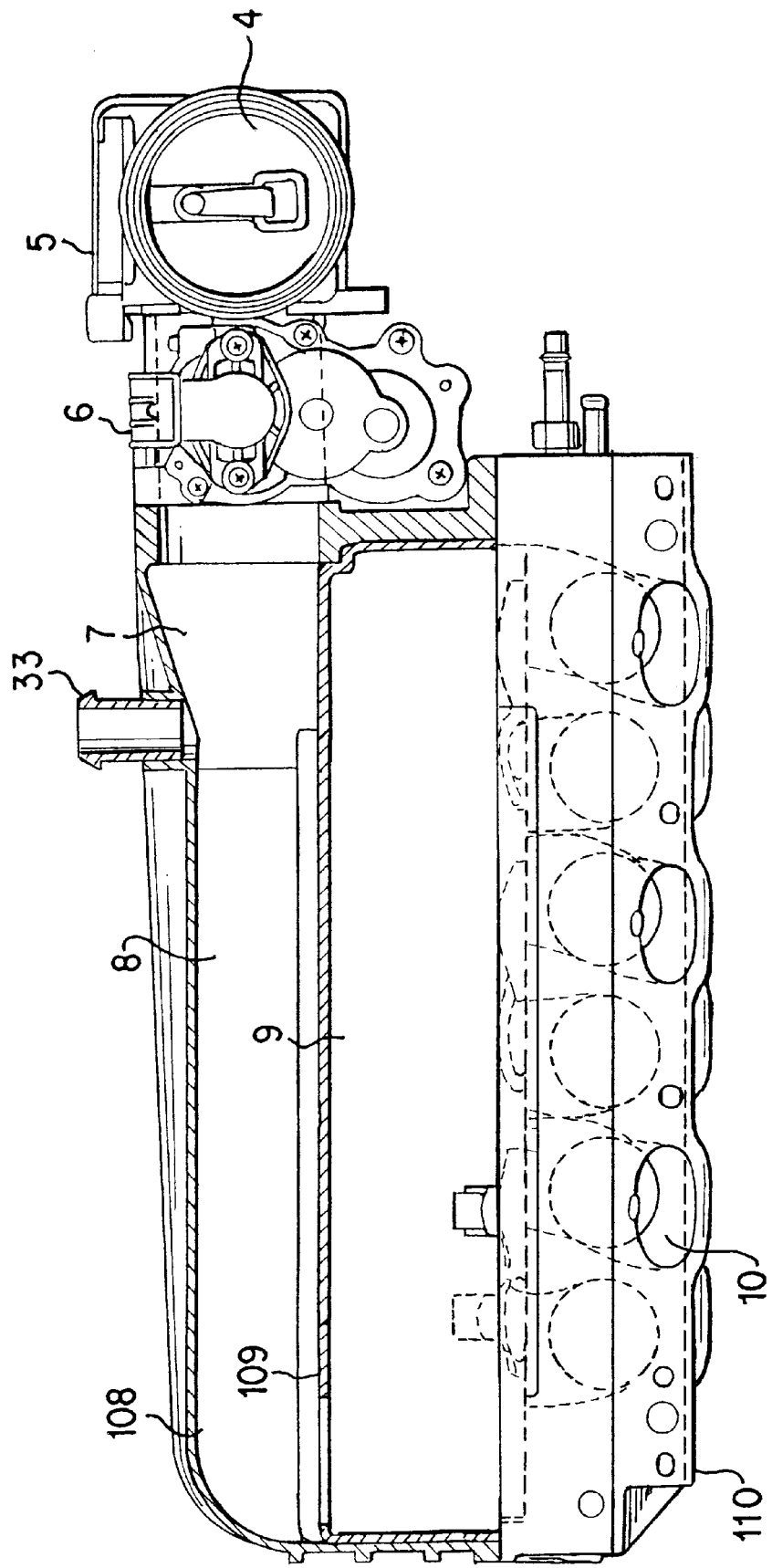
FIG. 23 is a view showing the arrangement of an EGR line.

FIG. 23 is a sectional side view of an embodiment of the invention in which an EGR (exhaust gas recirculation) outlet port 33 opening into the air inlet section 7 is located at the downstream side of the intake air flow path of the throttle 6 of the collector body 108. The provision of the outlet port 33 in the position shown in the drawing allows effective mixing of the intake air and the EGR gas, thereby insuring good distribution of the EGR gas to each cylinder of the engine.

Figure 24:
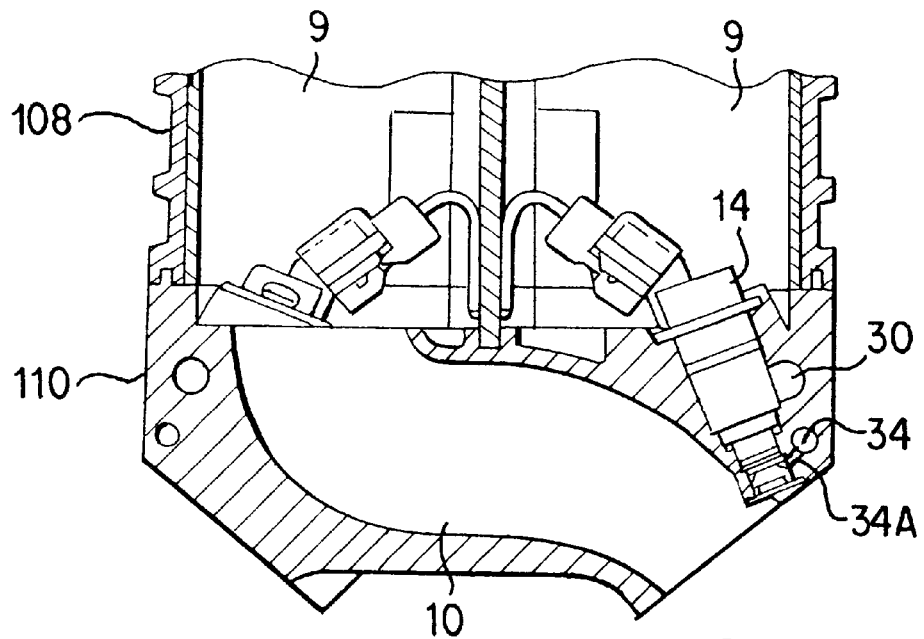
FIG. 24 is a view showing the constitution of another embodiment of the EGR line.

FIG. 24 shows a cross section of the injection valve 14 in the intake port body 110, in FIG. 23. (Members having the same function are designated by the same reference numerals in FIGS. 20 and 21.) Within the intake port body 110 is provided an EGR line 34, which is connected by a passage 34A to the intake port section 10. When the arrangement described above is used, there is no necessity to provide any additional pipe because the EGR line 34 is formed integral to the intake port body 110, and good air distribution to each cylinder is insured. Also since the outlet port 33 is located downstream of the injection valve 14, the injection valve 14 is unlikely to get stained.

Figure 25:
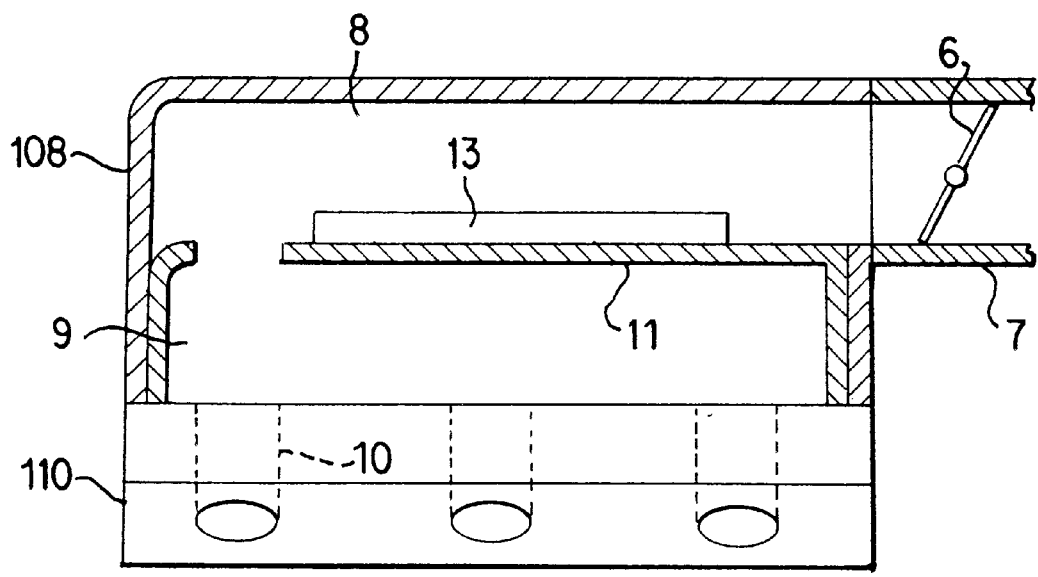
FIGS. 25 and 26 show alternative arrangements for mounting a control unit in the air induction system according to the invention.
Figure 26:
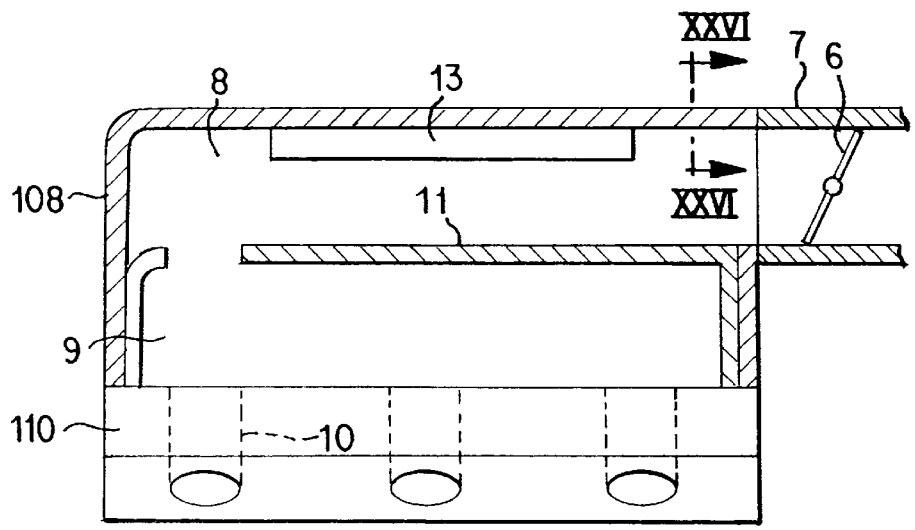

FIG. 25 is a longitudinal section for the present invention, which shows a possible arrangement of an electronic control unit in the air passage. The air inlet section 7 and the passage section 8 in this case are the same as that explained in FIG. 2 and other figures. The control unit 13 is provided within the passage section 8, thereby eliminating the need for a special mounting space. It is cooled by the intake air drawn in through the throttle 6. Furthermore, since the passage section 8 in which the control unit 13 is mounted on the partition wall 11 is connected to the intake port section 10 through the collector section 9 located downstream, there is no danger that the control unit 13 will get stained with blow-by fumes from the engine. FIG. 26 shows another embodiment in which the control unit 13 is mounted on the upper wall surface of the collector body 108. In this case also the same effect as that explained in FIG. 25 is obtained and will not be adversely affected if the wall surface is on curved so long as it is the inner wall surface of the collector body 108.

Figure 27:
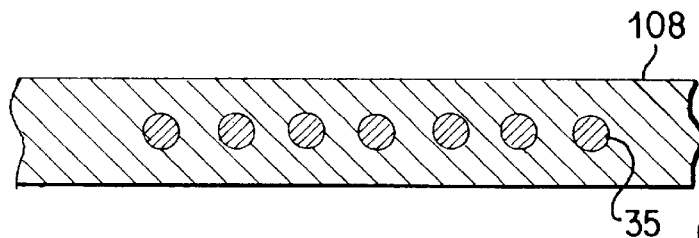
FIGS. 27–29 show an arrangement for electric power supply in an air induction system according to the invention.

A further feature of the air induction system according to the invention will be explained by referring to FIG. 27. FIG. 27 shows the section C—C of FIG. 26, in which the location of the section C—C is set in this position for the above-described reason, but is not restricted. The collector body 108 includes wires 35, by which the electric current is fed to each part.

Figure 28:
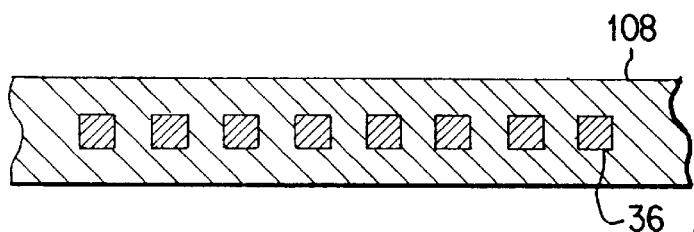

FIG. 28 shows a variation of FIG. 27, wherein the wires 36 have a square cross section. Of course, the cross sectional configuration of the wires 36 is not limited. Since the aforementioned arrangement can save the wire's space and moreover the wire itself requires no insulating covering, the air induction system has such an advantage as space saving and cost reduction.

Figure 29:
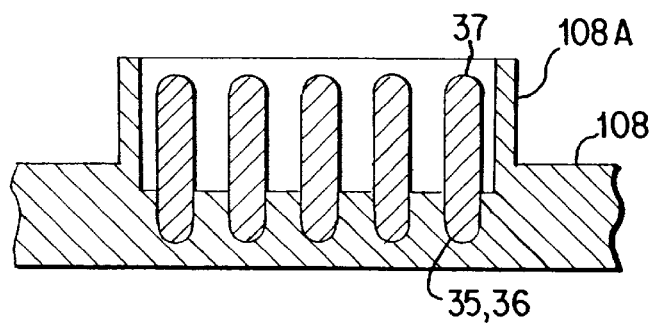

FIG. 29 shows a section of the end of the wires 35 or 36 arranged inside of the collector body 108. A connecting terminal 37 is provided at the end of the wires 35 or 36, and a connector 108A is molded integral with the collector body 108, to thereby enable connection of the wires for electric power supply to or electric power reception by, each part. This arrangement eliminates the need for separately preparing the connector mentioned above, thereby enabling space saving.

According to the present invention, the air induction system can be made compact while improving the intake performance. Thus, the engine can be compactly constituted, to thereby impart improved freedom of design to an automobile, and consequently to enable energy saving and cost reduction, thus obtaining a great advantage as the automobile.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air collector for guiding a flow of air from an air inlet to an intake port body of an internal combustion engine, comprising:

a first air flow body connected with said air inlet and a first side of intake ports of said intake port body, with a throttle valve interposed therein;

a second air flow body connected with said air inlet and a second side of intake ports of said intake port body, with said throttle valve interposed therein;

a shared wall disposed between and separating said first and second air flow bodies;

a hole disposed in said shared wall at a point separated from said air inlet; and a control valve disposed in said hole for controlling a resonance effect;

wherein said first and second air flow bodies are adapted to be mounted on said intake port body.

2. An air collector according to claim 1, wherein said first and second air flow bodies are disposed horizontally to said engine.

3. An air collector according to claim 2, wherein said first and second air flow body have refrain passages in which a direction of said flow of air is opposite to a direction in said first and second air flow bodies.

4. An air collector according to claim 3, wherein said first and second air flow bodies and said refrain passages are divided by walls.

5. An air collector according to claim 1, wherein said engine has two banks having cylinders which are arranged in a V shape, and said first and second air flow bodies are disposed on said banks of said engine.

6. An air collector according to claim 1, further comprising:

a control unit mounted on an interior surface of a wall of said collector, for controlling said engine.

7. An air collector according to claim 1, further comprising:

an electric wire for supplying electricity to a fuel supply device, said wire being arranged on an interior surface of a wall of said collector.

8. An air collector according to claim 7, wherein said electric wire is embedded in a wall of said collector.

9. An air collector according to claim 7, wherein said collector is made of a resin material having fibers arranged longitudinally adjacent to said collector.

10. An air intake system for guiding a flow of air to an intake port body of an internal combustion engine, comprising:

an air inlet;

an air flow body which is adapted to be mounted on said intake port body, and has first and second air passages separated by a shared wall therein, each of said air passages connecting said air inlet, via a throttle valve, to a different group of intake ports of said intake port body;

a hole in said shared wall, situated at a point separated from said air inlet; and a control valve disposed in said opening, for opening and closing said hole, regulating a resonance effect in said air flow body.

* * * * *